(12) United States Patent
Murao (10) Patent No.: US 7,166,377 B2
(45) Date of Patent: Jan. 23, 2007

(54) MAGNETIC RECORDING MEDIUM

(75) Inventor: Naoto Murao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/134,390

(22) Filed: May 23, 2005

(65) Prior Publication Data

US 2005/0266276 A1    Dec. 1, 2005

(30) Foreign Application Priority Data

May 24, 2004    (JP)    .............................. 2004-153559

(51) Int. Cl.
*G11B 5/66*    (2006.01)
*G11B 5/70*    (2006.01)

(52) U.S. Cl. .................................................. 428/840.2

(58) Field of Classification Search ............. 428/840.2; 360/55
See application file for complete search history.

(56) References Cited

U.S. PATENT DOCUMENTS 5,962,125 A * 10/1999 Masaki ..................... 428/842.3
2004/0197605 A1* 10/2004 Seki et al. ............ 428/694 TR

FOREIGN PATENT DOCUMENTS

JP    07 296360    * 11/1995

* cited by examiner

*Primary Examiner*—Holly Rickman
(74) *Attorney, Agent, or Firm*—Sughrue Mion, PLLC (57) ABSTRACT

In one aspect, the magnetic recording medium comprises a nonmagnetic layer comprising a nonmagnetic powder and a binder and a magnetic layer comprising a ferromagnetic powder and a binder in this order on a nonmagnetic support. The quantity of metal ions comprised in the nonmagnetic powder is equal to or less than 40 ppm/g. In a second aspect, the magnetic recording medium comprises a nonmagnetic layer comprising a nonmagnetic powder and a binder and a magnetic layer comprising a ferromagnetic powder and a binder in this order on a nonmagnetic support. The abrasiveness of the magnetic layer against a ferrite bar is equal to or less than $2\times10^{-5}$ μm/m. In both aspects, the quantity of metal ions extracted from the magnetic layer is equal to or less than 0.5 ppm/m$^2$·100 mL.

7 Claims, 2 Drawing Sheets

(Upper side view)

Fig. 4 ically employed in systems employing flexible media, these ferromagnetic powders have afforded low levels of saturation magnetization, precluding adequate output. However, the use of the magnetoresistive heads (MR heads) employed with hard disks has begun even in removable recording employing the above-mentioned flexible media.
MAGNETIC RECORDING MEDIUM

CROSS-REFERENCE TO RELATED APPLICATIONS

This application claims benefit of priority under 35 USC 119 to Japanese Patent Application No. 2004-153559 filed on May 24, 2004.

FIELD OF THE INVENTION

The present invention relates to a magnetic recording medium, in particular, employed in a magnetic recording and reproduction device in which a shield-type magnetoresistive reproduction head is employed.

BACKGROUND OF THE INVENTION

The need for high-density recording has increased in recent years, and thus magnetic recording media having good electromagnetic characteristics have been demanded. Reliability is also required in the repeated accessing and storage of data. Accordingly, magnetic recording media are required to have both good electromagnetic characteristics and good running durability.

Conventionally, magnetic recording media having a magnetic layer comprising iron oxide, Co-modified iron oxide, $CrO_2$, ferromagnetic metal powder, and/or hexagonal ferrite powder dispersed in binder and disposed on a nonmagnetic support have been widely employed. Of these, microparticulate ferromagnetic alloy powders and hexagonal ferrite micropowders are known to afford high-density recording characteristics. However, when employing inductive heads that have been mainly employed in systems employing flexible media, these ferromagnetic powders have afforded low levels of saturation magnetization, precluding adequate output. However, the use of the magnetoresistive heads (MR heads) employed with hard disks has begun even in removable recording employing the above-mentioned flexible media.

The size of the MR elements in MR heads has decreased as higher density levels have been achieved. However, the smaller MR elements emit heat when even a small current is passed through them, causing the temperature to rise sharply. When a head at high temperature comes in contact with the surface of the magnetic layer of a tape on which impurities are present, a burning phenomenon occurs and material adheres to the head. Such head deposits cause an increase in the error rate with repeated running.

Accordingly, the quantity of abrasive added to the tape has been increased and large particle abrasives have been employed to reduce head deposits. However, although such methods bring about improvement in the error rate caused by head deposits, they have a drawback in the form of considerable shortening of the service life of the head. In particular, the computer data storage tapes of recent years have tended to become thinner and the wavelength of the recording signal to become shorter in order to increase storage capacity. In such magnetic tapes, even spacings due to deposits of several tens of nanometers decrease the reproduction output to deteriorate the error rate. Further, the reduction in head size is continuing and even slight head abrasion quickly increases the error rate.

In order to reduce head deposits, it was proposed to specify the quantity of fatty acids extracted from the magnetic layer and the quantity of water-soluble metal ions to reduce the level of precipitates following storage at high temperature and high humidity (Japanese Unexamined Patent Publication (KOKAI) Heisei Nos. 7-296360 and 7-296366). According to the techniques described in the above publications, the level of precipitates due to storage could be reduced, but due to the low level of fatty acids, there is a problem in that more matter adheres to the head with repeated running and the error rate increases.

It is an object of the present invention to provide a magnetic recording medium having excellent electromagnetic characteristics with reduced head deposits.

SUMMARY OF THE INVENTION

The aforementioned object of the present invention can be achieved by;

a magnetic recording medium comprising a nonmagnetic layer comprising a nonmagnetic powder and a binder and a magnetic layer comprising a ferromagnetic powder and a binder in this order on a nonmagnetic support, wherein
the quantity of metal ions extracted from said magnetic layer is equal to or less than 0.5 ppm/$m^2 \cdot$100 mL, and
the quantity of metal ions comprised in said nonmagnetic powder is equal to or less than 40 ppm/g;

a magnetic recording medium comprising a nonmagnetic layer comprising a nonmagnetic powder and a binder and a magnetic layer comprising a ferromagnetic powder and a binder in this order on a nonmagnetic support, wherein
the quantity of metal ions extracted from said magnetic layer is equal to or less than 0.5 ppm/$m^2 \cdot$100 mL, and
the abrasiveness of said magnetic layer against a ferrite bar is equal to or less than $2 \times 10^{-5}$ μm/m.

The aforementioned magnetic recording media are preferably employed in a magnetic recording and reproduction device in which a magnetoresistive (MR) reproduction head is employed.

The aforementioned MR reproduction head is preferably a shield-type MR reproduction head.

In the aforementioned magnetic recording media, the magnetic layer preferably has a surface electrical resistivity ranging from $10^{+6}$ to $10^{+8}$ Ω.

The aforementioned magnetic recording media preferably have a backcoat layer on the surface of the nonmagnetic support, opposite to the surface having the magnetic layer.

According to the invention of claim 1, provided is a magnetic recording medium having excellent electromagnetic characteristics with reduced head deposits.

According to the invention of claim 5, provided is a magnetic recording medium having excellent electromagnetic characteristics, in which both reductions of head deposits and head abrasion are achieved.

The first aspect of the magnetic recording medium of the present invention (also referred to as "magnetic recording medium 1" hereinafter) is a magnetic recording medium comprising a nonmagnetic layer comprising a nonmagnetic powder and a binder and a magnetic layer comprising a ferromagnetic powder and a binder in this order on a nonmagnetic support, wherein the quantity of metal ions extracted from said magnetic layer is equal to or less than 0.5 ppm/m$^2$·100 mL, and the quantity of metal ions comprised in said nonmagnetic powder is equal to or less than 40 ppm/g.

In magnetic recording medium 1, the quantity of metal ions extracted from the magnetic layer is equal to or less than 0.5 ppm/m$^2$·100 mL. When the quantity of metal ions extracted from the magnetic layer exceeds 0.5 ppm/m$^2$·100 mL, head deposits increase. These head deposits are thought to consist of fatty acid metal salts produced by the bonding of metal ions and acid components produced by hydrolysis of fatty acids and fatty esters in the magnetic layer through the effects of atmospheric moisture. Such head deposits separate from the head during tape running and move between the tape and the head, causing head wear, a reduction in electromagnetic characteristics, and an increase in noise. Accordingly, in the present invention, the quantity of metal ions extracted from the magnetic layer is defined to equal to or less than 0.5 ppm/m$^2$·100 mL. Thus, it is possible to inhibit the adhesion of matter to the head. The quantity of metal ions extracted from the magnetic layer is preferably equal to or less than 0.2 ppm/m$^2$·100 mL, more preferably equal to or less than 0.1 ppm/m$^2$·100 mL. The lower limit of metal ions extracted from the magnetic layer is preferably 0 ppm/m$^2$·100 mL. However, reducing the quantity of metal ions extracted from the magnetic layer to 0 ppm/m$^2$·100 mL is sometimes difficult from the perspective of production cost. In practical terms, a lower limit of 0.005 ppm/m$^2$·100 mL can be adopted.

The metal ions may be ions of alkali metals such as sodium and potassium; ions of alkaline earth metals such as calcium and barium; or ions of iron group metals such as iron, nickel, cobalt, phosphorus, and yttrium.

The quantity of metal ions extracted is measured as follows.

A 100 mL quantity of ion exchange water is added to a 300 mL capacity triangular flask and, for example, 5.0 m of magnetic tape ½ inch in width is *soaked*. The triangular flask is subjected to 60 minutes of vibration at 60 cycles/min. at 40° C. in an isothermal vibrator (BT-25 Incubator made by Yamato Kagaku) to conduct extraction treatment. The quantity of metal ions extracted into the water is measured by atomic absorption analysis and denoted in units of the amount per unit surface area of the magnetic layer (ppm/m$^2$·100 mL). In tapes having a backcoat layer, the backcoat layer is scraped off with a razor blade or the like and the quantity of metal ions in the powder is measured. This quantity is then subtracted from the amount of metal ions extracted from the tape to obtain the quantity of metal ions extracted from the magnetic layer.

The method of controlling the amount of metal ions extracted from the magnetic layer will be described below.

The present inventors discovered that most of the metal ions extracted from the magnetic layer were metal ions comprised in the nonmagnetic powder comprised in the nonmagnetic layer positioned under the magnetic layer, and that by reducing the quantity of metal ions comprised in the nonmagnetic powder, it was possible to reduce the quantity of metal ions extracted from the magnetic layer. Specifically, employing nonmagnetic powder with a quantity of metal ions of equal to or less than 40 ppm/g, preferably equal to or less than 10 ppm/g, as the nonmagnetic powder comprised in the nonmagnetic layer, permits a reduction in the amount of metal ions extracted from the magnetic layer to equal to or less than 0.5 ppm/m$^2$·100 mL. The quantity of metal ions comprised in the nonmagnetic powder can be reduced by washing the nonmagnetic powder with water. Adjusting the pH to within a range between 8 and 9 during washing with water also permits a reduction in the metal ions extracted from the nonmagnetic powder. The lower limit of the quantity of metal ions comprised in the nonmagnetic powder is preferably 0 ppm/g, but in consideration of manufacturing cost and the like, a lower limit of 2 ppm/g can be adopted.

For example, the quantity of metal ions comprised in the nonmagnetic powder and the quantity of metal ions comprised in the ferromagnetic powder, described further below, can be measured by the following method:

(1) Comminuting a sample in a mortar.
(2) Precisely weighing the comminuted sample and adding to a prescribed amount of pure water.
(3) Boiling for a prescribed period, cooling, and filtering the pure water containing the sample.
(4) Diluting the filtrate to a prescribed concentration and measuring the quantities of the elements contained with an atomic absorption analyzer.

The ferromagnetic powder comprised in the magnetic layer can be processed by the following method to adjust the quantity of metal ions extracted from the magnetic layer to equal to or less than 0.5 ppm/m$^2$·100 mL.

(1) The water-soluble metal component contained in the ferromagnetic powder is eliminated by washing with water the ferromagnetic powder and/or the starting materials thereof. In such washing with water, the quantity of metal ions contained in the ferromagnetic powder is preferably reduced to equal to or less than 35 ppm/g. The quantity of metal ions contained in the ferromagnetic powder is more preferably equal to or less than 20 ppm/g, and further preferably, equal to or less than 10 ppm/g. The lower limit of the quantity of metal ions contained in the ferromagnetic powder is preferably 0 ppm/g, but in consideration of manufacturing costs, a lower limit of 2 ppm/g may be adopted.
(2) In the case of a ferromagnetic metal powder, it is possible to provide an oxide layer on the surface thereof or to treat the surface with resin or a reactive organic chemical. Reference may be made to Japanese Unexamined Patent Publication (KOKAI) Showa 60-150228 for such treatment methods.

In the present invention, the above methods may be suitably combined to adjust the quantity of metal ions extracted from the magnetic layer.

The second aspect of the magnetic recording medium of the present invention (also referred to as "magnetic recording medium 2" hereinafter) is a magnetic recording medium comprising a nonmagnetic layer comprising a nonmagnetic powder and a binder and a magnetic layer comprising a ferromagnetic powder and a binder in this order on a nonmagnetic support, wherein the quantity of metal ions extracted from said magnetic layer is equal to or less than 0.5 ppm/m$^2$·100 mL, and the abrasiveness of said magnetic layer against a ferrite bar is equal to or less than $2 \times 10^{-5}$ µm/m.

The quantity of metal ions extracted from the magnetic layer, the measurement method, and the control methods for magnetic recording medium 2 are all identical to those set forth above for magnetic recording medium 1.

In magnetic recording medium 2, the abrasiveness of the magnetic layer against a ferrite bar is equal to or less than $2\times10^{-5}/\mu m/m$. Here, the phrase "abrasiveness of the magnetic layer against a ferrite bar" is a value measured as follows.

Figure 1:
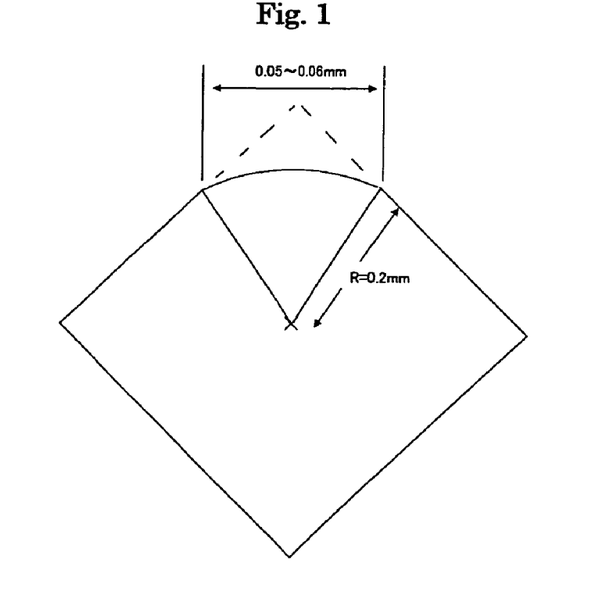
FIG. 1 shows a sectional view of a square bar used for the measurement of the abrasiveness of the magnetic layer against a ferrite bar.

FIG. 1 shows a sectional view of a square bar used to measure the abrasiveness of the magnetic layer against a ferrite bar.

First, the front tip of a 90 degree square bar comprised of MnZn ferrite head material or an equivalent substance (NiZn ferrite, for example) is machined to a width of 0.05 to 0.06 mm, and processed to 0.2 mmR (see FIG. 1). Next, a tape 300 m in length is run by 600 times (300 back and forth passes). At this time, the speed is 2.5 m/s, the tension is 113 gr, and the lapping angle is 16 degrees. The wear width is measured by a comparator and the abrasiveness is calculated by the following equation:

$$\text{Abrasiveness } (\mu m/m) = (W1 - W0)/L$$

W1: wear width after running ($\mu m$), W0: wear width before running ($\mu m$), L: running width (m).

In magnetic recording medium 2, the abrasiveness calculated by the aforementioned method is equal to or less than $2\times10^{-5}$ $\mu m/m$. When the abrasiveness exceeds $2\times10^{-5}$ $\mu m/m$, reproduction output deteriorates due to head wear. There is also a further problem in the form of short head life. The abrasiveness is preferably equal to or less than $1\times10^{-5}$ $\mu m/m$, more preferably from $0.02\times10^{-5}$ to $0.2\times10^{-5}$ $\mu m/m$.

In conventional magnetic recording media, the magnetic layer surface is imparted with a prescribed abrasiveness to remove head deposits. However, when the abrasiveness of the magnetic layer surface increases, there is a problem in the form of increased head wear. By contrast, in magnetic recording medium 2 of the present invention, as set forth above, reducing the quantity of metal ions extracted from the magnetic layer surface to equal to or less than 0.5 ppm/$m^2 \cdot 100$ mL inhibits adhesion of matter to the head. Thus, it is possible to obtain good electromagnetic characteristics, not by increasing the abrasiveness of the magnetic layer, but with a reduction in the abrasiveness of the magnetic layer against a ferrite bar to equal to or less than $2\times10^{-5}$ $\mu m/m$.

In above-described magnetic recording medium 1, as well, the abrasiveness of the magnetic layer against a ferrite bar is preferably equal to or less than $2\times10^{-5}$ $\mu m/m$, more preferably equal to or less than $1\times10^{-5}$ $\mu m/m$, and further preferably, from $0.02\times10^{-5}$ to $2\times10^{-5}$ $\mu m/m$.

The abrasiveness of the magnetic layer against a ferrite bar can be controlled by adjusting the particle size and the quantity of abrasive added to the magnetic layer. In magnetic recording media 1 and 2 of the present invention, the particle size of the abrasive contained in the magnetic layer preferably ranges from 0.10 to 0.30 $\mu m$, more preferably from 0.10 to 0.18 $\mu m$. The quantity of abrasive contained in the magnetic layer preferably ranges from 5 to 20 weight parts, more preferably 8 to 15 weight parts per 100 weight parts of ferromagnetic powder.

The abrasiveness of the magnetic layer against a ferrite bar may also be controlled by surface processing. Surface processing may be conducted by knife blade or lapping tape. The material of the knife blade may be stainless steel, sapphire, chromium steel, or any other material commonly employed in knife blades. The lapping tape may have, for example, a surface roughness of from #300 to #10,000. The knife blade or lapping tape is pressed against the magnetic layer surface at an angle ranging from 5 to 90 degrees, for example, to remove foreign matter (protrusions) from the surface of the tape and thereby control the abrasiveness of the magnetic layer against a ferrite bar.

The magnetic recording medium of the present invention is preferably employed in a magnetic recording and reproduction device in which a MR reproduction head is employed. In the description given below, the phrase "magnetic recording medium of the present invention" refers to above-described magnetic recording media 1 and 2.

A magnetoresistive head (MR head) is a reproduction head employing a magnetoresistive effect. MR elements are comprised of permalloy and generally operate on a bias current of several mA. In contrast to conventional magnetic induction heads, MR heads are capable of high resolution with only slight changes in the external magnetic field and are widely employed as HDD reproduction heads and as reproduction heads in high-density tape data storage.

As set forth above, MR heads have been decreasing in size as density levels have been increasing. However, small MR elements generate heat when only a slight current is passed through them, quickly heating up. Thus, when foreign matter present on the surface of the magnetic layer comes into contact with a head that is hot, a burning phenomenon occurs, causing the foreign matter to adhere to the head.

By contrast, reducing the amount of metal ions extracted from the magnetic layer to equal to or less than 0.5 ppm/$m^2 \cdot 100$ mL in the magnetic recording medium of the present invention prevents the depositing of foreign matter on the surface of the magnetic layer. Thus, when the magnetic recording medium of the present invention is employed in magnetic reproduction devices using MR reproduction heads, little foreign matter adheres to the head due to the burning phenomenon, yielding good electromagnetic characteristics.

It is particularly preferred to employ the magnetic recording medium of the present invention in magnetic reproduction devices employing shield-type MR reproduction heads. MR heads in which shield members of cobalt alloy or the like are provided on both ends of the MR head to prevent the effects of leaking magnetic fields on the recording signal recorded on the tape are called shield-type MR reproduction heads. In shield-type MR reproduction heads, when an MR element or a shield member wears down, a phenomenon known as pole tip recession (PTR) occurs. PTR refers to the increasing distance between the guard material and the head and is a cause of signal deterioration in MR reproduction heads.

As stated above, in the magnetic recording medium of the present invention, the quantity of metal ions extracted from the magnetic layer is equal to or less than 0.5 ppm/$m^2 \cdot 100$ mL and generation of head deposits is prevented, permitting a reduction in the abrasiveness of the magnetic layer. The magnetic recording medium of the present invention, in which the abrasiveness of the magnetic layer has been reduced in this fashion, permits a reduction in the wearing down of MR elements and shield members, thereby preventing MR reproduction head signal deterioration by PTR.

Figure 2:
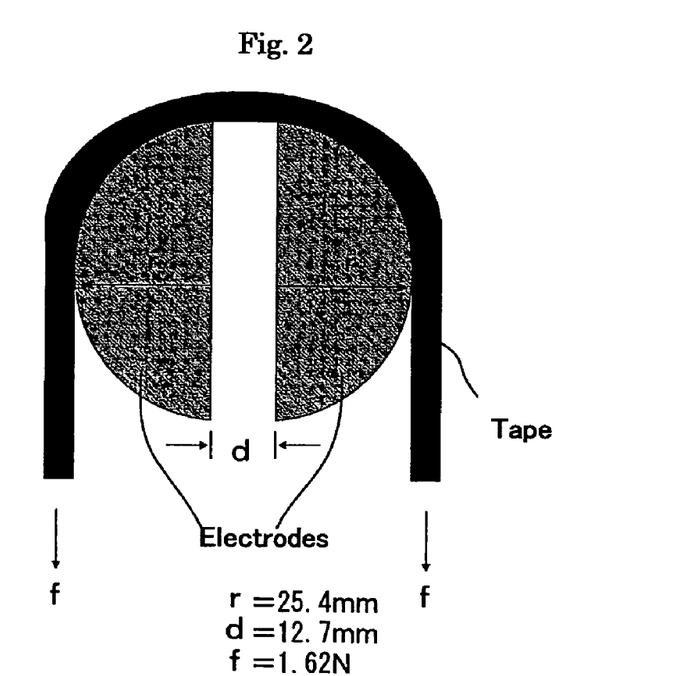
FIG. 2 is a drawing for the explanation of the measurement method of the surface electrical resistivity of the magnetic layer.

In the magnetic recording medium of the present invention, a magnetic layer preferably has a surface electrical resistivity ranging from $10^{+6}$ to $10^{+8}$ $\Omega$. When the magnetic recording medium of the present invention is being employed in a magnetic recording and reproduction device using a MR reproduction head and the electrical conductivity of the magnetic layer is excessively high, the current flowing to the MR element flows to the tape side and there is a risk that the metal components constituting the MR element will precipitate, causing foreign matter to adhere to the head. Further, when the electrical conductivity of the magnetic layer is excessively low, there is discharge to the head side, noise increases, and in some cases, the head is damaged. By contrast, when the surface electrical resistivity of the magnetic layer is within a range from $10^{+6}$ to $10^{+8}$ Ω, a magnetic recording and reproduction device employing a MR head can record and reproduce properly without such problems occurring. The surface electrical resistivity of the magnetic layer preferably ranges from $5\times10^{+6}$ to $5\times10^{+7}$ Ω, more preferably from $1\times10^{+7}$ to $5\times10^{+7}$ Ω. The surface electrical resistivity of the magnetic layer can be measured, for example, with electrodes as shown in FIG. 2.

The surface electrical resistivity of the magnetic layer can be controlled by adjusting quantity of carbon black comprised in the magnetic layer and the nonmagnetic layer, especially comprised in the nonmagnetic layer. The quantity of carbon black comprised in the magnetic layer preferably ranges from

[Magnetic Layer]

Examples of ferromagnetic powders suitable for use in the magnetic layer are ferromagnetic metal powders and hexagonal ferrite powders.

Preferred ferromagnetic metal powders are those having a principal component in the form of α-Fe. In addition to prescribed atoms, the ferromagnetic metal powder may comprise the following atoms: Al, Si, Ca, Mg, Ti, Cr, Cu, Y, Sn, Sb, Ba, W, La, Ce, Pr, Nd, P, Co, Mn, Zn, Ni, Sr, and B. The incorporation of at least one from among Al, Ca, Mg, Y, Ba, La, Nd, Sm, Co, and Ni in addition to α-Fe is desirable. As mentioned above, these ferromagnetic metal powders are preferably washed with water to reduce the content of metal ions to equal to or less than 35 ppm/g. These ferromagnetic metal powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

A small quantity of hydroxide or oxide may be incorporated into the ferromagnetic metal power. Ferromagnetic metal powder obtained by known manufacturing methods may be employed. Examples of methods are given below: the method of obtaining Fe or Fe—Co particles by reducing with a reducing gas a hydrous iron oxide or iron oxide that has been treated to prevent sintering; the method of reducing a complex organic acid salt (primarily oxalates) by means of a reducing gas such as hydrogen or the like; the method of thermally decomposing a metal carbonyl compound; the method of reduction by adding a reducing agent such as sodium boron hydride, hypophosphite, or hydrazine to an aqueous solution of a ferromagnetic metal; and the method of obtaining powders by vaporizing a metal in an inert gas at low pressure. The ferromagnetic metal powders thus obtained can be subjected to known slow oxidation treatments. Methods in which hydrous iron oxide or iron oxide is reduced with a reducing gas such as hydrogen and the partial pressures of the oxygen-comprising gas and inert gas, the temperature, and the time are controlled to form an oxide film on the surface result in little demagnetization are preferred as slow oxidation treatments.

The specific surface area by BET method ($S_{BET}$) of the ferromagnetic metal powder preferably ranges from 40 to 80 m²/g, more preferably from 45 to 70 m²/g. At equal to or greater than 40 m²/g, noise decreases, and at equal to or less than 80 m²/g, a smooth surface can be obtained, thus both are preferred. The crystallite size of the ferromagnetic metal powder preferably ranges from 80 to 180 Å, more preferably from 100 to 170 Å, and further preferably from 110 to 165 Å. The mean major axis length of the ferromagnetic metal powder preferably ranges from 30 to 60 nm, more preferably from 40 to 60 nm. The average acicular ratio {average of (major axis length/minor axis length)} of the ferromagnetic metal powder preferably ranges from 3 to 15 and more preferably from 3 to 10. The saturation magnetization (σs) of the ferromagnetic metal powder preferably ranges from 90 to 170 A·m²/kg, more preferably from 100 to 160 A·m²/kg, and further preferably from 110 to 160 A·m²/kg. The coercivity of the ferromagnetic metal powder preferably ranges from 1,700 to 3,500 Oe (135 to 279 kA/m), more preferably from 1,800 to 3,000 Oe, approximately 142 to 239 kA/m.

The moisture content of the ferromagnetic metal powder preferably ranges from 0.1 to 2 weight percent; the moisture content of the ferromagnetic metal powder is desirably optimized by means of the type of binder. The pH of the ferromagnetic metal powder is desirably optimized in combination with the binder employed; the range is normally pH 6 to 12, preferably pH 7 to 11. The stearic acid (SA) adsorption capacity of the ferromagnetic metal powder (the scale of basic points on the surface) is usually 1 to 15 μmol/m², preferably from 2 to 10 μmol/m², and more preferably from 3 to 8 μmol/m². When employing a ferromagnetic metal powder with a high stearic acid adsorption capacity, surface modification with an organic compound adsorbing strongly onto the surface is desirable to create a magnetic recording medium. Further, the ferromagnetic metal powder employed in the present invention desirably has few pores. The content of pores is preferably equal to or less than 20 volume percent, more preferably equal to or less than 5 volume percent. So long as the above-stated particle size and magnetic characteristics are satisfied, the particles may be acicular, rice-particle shaped, or spindle-shaped. The switching field distribution (SFD) of the ferromagnetic metal powder itself is desirably low. If the SFD of the magnetic recording medium is low, magnetization reversal is sharp and peak shifts are small, which are suited to high density digital magnetic recording. It is preferable to narrow the Hc distribution of the ferromagnetic metal powder. A low Hc distribution is achieved, for example, by improving the goethite particle size distribution in the ferromagnetic metal powder; by employing monodispersed α-Fe₂O₃; by preventing sintering between particles.

Examples of hexagonal ferrite powders suitable for use in the present invention are barium ferrite, strontium ferrite, lead ferrite, calcium ferrite, and various substitution products thereof, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, Nb, and the like. Compounds to which elements such as Co—Zn, Co—Ti, Co—Ti—Zr, Co—Ti—Zn, Ni—Ti—Zn, Nb—Zn—Co, Sn—Zn—Co, Sn—Co—Ti and Nb—Zn have been added may generally also be employed. They may comprise specific impurities depending on the starting materials and manufacturing methods employed. As mentioned above, these hexagonal ferrite powders are preferably washed with water to reduce the content of metal ions to equal to or less than 35 ppm. The mean plate diameter of the hexagonal ferrite powder preferably ranges from 15 to 40 nm, more preferably 20 to 40 nm. Particularly when employing a MR head in reproduction to increase a track density, a plate diameter equal to or less than 40 nm is desirable to reduce noise. A mean plate diameter equal to or higher than 15 nm yields stable magnetization without the effects of thermal fluctuation. A mean plate diameter equal to or less than 40 nm permits low noise and is suited to the high-density magnetic recording. The mean plate thickness of the hexagonal ferrite powder preferably ranges from 4 to 15 nm. At equal to or greater than 4 nm, stable production is possible and at equal to or less than 15 nm, adequate orientation can be obtained.

The plate ratio (plate diameter/plate thickness) of the hexagonal ferrite powder preferably ranges from 1 to 15, more preferably from 1 to 7. To achieve adequate orientation while maintaining a high filling property, the plate ratio is desirably equal to or higher than 1. When the plate ratio is equal to or less than 15, noise can be prevented due to stacking between particles. The specific surface area by BET method of the hexagonal ferrite particles having such particle sizes ranges from 30 to 200 $m^2/g$, almost corresponding to an arithmetic value from the particle plate diameter and the plate thickness. Narrow distributions of particle plate diameter and thickness are normally good. Although difficult to render in number form, about 500 particles can be randomly measured in a TEM photograph of particles to make a comparison. This distribution is often not a normal distribution. However, when expressed as the standard deviation to the average particle size, $\sigma$/average particle size=0.1 to 1.5. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known. By a vitrified crystallization method, uniform powders can be produced by performing repeated thermal treatments to separate nuclear generation and growth.

A coercivity (Hc) of the hexagonal ferrite powder of about 50 to 5,000 Oe, approximately 40 to 398 kA/m, can normally be achieved. A high coercivity Hc is advantageous for high-density recording, but this is limited by the capacity of the recording head. Coercivity (Hc) can be controlled by particle size (plate diameter and plate thickness), the types and quantities of elements contained, substitution sites of the element, the particle producing reaction conditions, and the like. The saturation magnetization ($\sigma s$) can be 30 to 70 $A \cdot m^2/kg$. The saturation magnetization ($\sigma s$) tends to decrease with decreasing particle size. Known methods of improving saturation magnetization ($\sigma s$) are lowering a crystallization temperature, shortening a thermal treatment time, increasing the quantity of compounds added, increasing the level of surface treatment, and the like. It is also possible to employ W-type hexagonal ferrite powder. When dispersing hexagonal ferrite powder, the surface of the hexagonal ferrite powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added may ranges from 0.1 to 10 weight percent relative to the hexagonal ferrite powder. The pH of the hexagonal ferrite powder is also important to dispersion. A pH of 4 to 12 is usually optimum for the dispersion medium and polymer. From the perspective of the chemical stability and storage properties of the medium, a pH of about 6 to 11 can be selected. Moisture contained in the hexagonal ferrite powder also affects dispersion. There is an optimum level for the dispersion medium and polymer, usually selected from the range of 0.1 to 2.0 weight percent.

Methods of manufacturing hexagonal ferrite include: (1) a vitrified crystallization method in which a metal oxide substituted with barium carbonate, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; (2) a hydrothermal reaction method in which a barium ferrite composition metal salt solution is neutralized with an alkali, the by-products are removed, the solution is liquid-phase heated at equal to or higher than 100° C., and the product is washed, dried, and pulverized to obtain barium ferrite crystal powder; and (3) a coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

Examples of types of carbon black that are suitable for use in the magnetic layer are: furnace black for rubber, thermal for rubber, black for coloring, conductive carbon black and acetylene black. A specific surface area of 5 to 500 $m^2/g$, a DBP oil absorption capacity of 10 to 400 ml/100 g, an average particle size of 5 to 300 nm, a pH of 2 to 10, a moisture content of 0.1 to 10 weight percent, and a tap density of 0.1 to 1 g/cc are respectively desirable. Specific examples of types of carbon black employed in the magnetic layer are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating liquid. These carbon blacks may be used singly or in combination. In order to achieve a desired surface electrical resistivity of the magnetic layer, the quantity of carbon black comprised in the magnetic layer preferably ranges from 1 to 25 weight parts, more preferably from 3 to 15 weight parts with respect to 100 weight parts of the ferromagnetic powder. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, be optimized for each layer. For example, *Carbon Black Handbook* compiled by the Carbon Black Association may be consulted for types of carbon black suitable for use in the present invention.

Known materials, chiefly with a Mohs' hardness equal to or higher than 6, such as α-alumina having an α-conversion rate equal to or higher than 90 percent, β-alumina, microparticulate diamond, silicon carbide, chromium oxide, cerium oxide, α-iron oxide, corundum, silicon nitride, titanium carbide, titanium oxide, silicon dioxide, and boron nitride, may be used singly or in combination as abrasives in the magnetic layer. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 weight percent. The particle size of these abrasives preferably ranges from 0.10 to 0.30 μm, further preferably from 0.10 to 0.18 μm. A narrow particle size distribution is particularly desirable for improving electromagnetic characteristics. As needed to improve durability, abrasives of differing particle size may be combined or the same effect may be achieved by broadening the particle diameter distribution even with a single abrasive. In addition, the abrasiveness of the magnetic layer against a ferrite bar can be controlled to the desired level by adjusting the quantity of abrasives comprised in the magnetic layer. A tap density of 0.3 to 1.5 g/cc, a moisture content of 0.1 to 5 weight percent, a pH of 2 to 11, and a specific surface area of 1 to 40 $m^2/g$ are respectively desirable. The abrasive employed in the present invention may be any of acicular, spherical, or cubic in shape.

Specific examples are: AKP-10, AKP-15, AKP-20, AKP-30, AKP-50, HIT-20, HIT-30, HIT-50, HIT-60A, HIT-50G, HIT-70, HIT-80, HIT-82 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF140 from Toda Kogyo Corp.; Beta Random Ultrafine from Ibidene Co.; and B-3 from Showa Mining Co., Ltd. As needed, these abrasives may be added to the nonmagnetic layer. Addition to the nonmagnetic layer permits control of surface shape and control of the manner in which the abrasive protrudes. It is, as a matter of course, preferred that the particle diameter and quantity of abrasive added to the magnetic layer and nonmagnetic layer are optimally established.

[Nonmagnetic Layer]

Details of the nonmagnetic layer will be described below.

The nonmagnetic layer is not specifically limited so long as it is substantially nonmagnetic; within the scope of being substantially nonmagnetic, it may contain a magnetic powder. The term "substantially nonmagnetic" allows for some magnetism of the nonmagnetic layer so long as it does not substantially compromise the electromagnetic characteristics of the magnetic layer.

The nonmagnetic powder comprised in the nonmagnetic layer can be selected from inorganic compounds such as metal oxides, hydrous metal oxides, metal carbonates, metal nitrides, metal carbides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, goethite, silicon nitride, titanium dioxide, silicon dioxide, tin oxide, magnesium oxide, zirconium oxide, zinc oxide, and barium sulfate; these may be employed singly or in combination. Particularly desirable due to their narrow particle distribution and numerous means of imparting functions are titanium dioxide, zinc oxide, α-iron oxide, goethite and barium sulfate. Even more preferred are titanium dioxide and α-iron oxide and goethite. α-iron oxide employed is desirably prepared from metal starting materials and magnetic iron oxide of uniform particle size that have been dehydrated by heating, annealed to reduce voids, and surface treated as necessary. As mentioned above, in magnetic recording medium 1, the quantity of metal ions comprised in the nonmagnetic powder is equal to or less than 40 ppm/g. In magnetic recording medium 2, the nonmagnetic powder in which the quantity of metal ions comprised is equal to or less than 40 ppm/g is preferably employed.

The mean particle diameter of these nonmagnetic powders preferably ranges from 0.005 to 1 μm, but nonmagnetic powders of differing particle size may be combined as needed, or the particle diameter distribution of a single nonmagnetic powder may be broadened to achieve the same effect. What is preferred most is a mean particle diameter in the nonmagnetic powder ranging from 0.01 to 0.5 μm. Particularly when the nonmagnetic powder is a granular metal oxide, a mean particle diameter equal to or less than 0.08 μm is preferred, and when an acicular metal oxide, the mean major axis length is preferably equal to or less than 0.3 μm, more preferably equal to or less than 0.2 μm. The tap density preferably ranges from 0.3 to 1.5 g/ml, more preferably from 0.4 to 1.3 g/ml. The moisture content of the nonmagnetic powder preferably ranges from 0.2 to 5 weight percent, more preferably from 0.3 to 3 weight percent, further preferably from 0.3 to 1.5 weight percent. The pH of the nonmagnetic powder preferably ranges from 3 to 12, and the pH between 5.5 to 11 is particular preferred. The specific surface area of the nonmagnetic powder preferably ranges from 1 to 100 $m^2/g$, more preferably from 5 to 80 $m^2/g$, further preferably from 10 to 80 $m^2/g$. The crystallite size of the nonmagnetic powder preferably ranges from 40 to 1000 Å, further preferably from 40 to 800 Å. The oil absorption capacity using dibutyl phthalate (DBP) preferably ranges from 5 to 100 ml/100 g, more preferably from 10 to 80 ml/g, further preferably from 20 to 60 ml/100 g. The specific gravity preferably ranges from 1.5 to 7, more preferably from 3 to 6. The shape of the nonmagnetic powder may be any of acicular, spherical, polyhedral, or plate-shaped. The stearic acid (SA) adsorption capacity of the nonmagnetic powder preferably ranges from 1 to 20 $\mu mol/m^2$, more preferably from 2 to 15 $\mu mol/m^2$, further preferably from 3 to 8 $\mu mol/m^2$. When the nonmagnetic powder with high stearic acid (SA) adsorption capacity is employed, it is preferable to modify the surface of the nonmagnetic powder with an organic compound strongly adsorbing on the surface. The surface of these nonmagnetic powders is preferably treated with Al—, Mg—, Si—, Ti—, Zr—, Sn—, Sb—, Zn— or Y-based compound. The surface-treating agents of preference with regard to dispersibility are $Al_2O_3$, $SiO_2$, $TiO_2$, $ZrO_2$, MgO and hydrous oxides thereof, and $Al_2O_3$, $SiO_2$, $ZrO_2$ and hydrous oxides thereof are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-10 and HIT-82 from Sumitomo Chemical Co., Ltd.; α-iron oxide DPN-250BX, DPN-245, DPN-270BX, DPN-550BX, DPN-550RX, DPN-650RX and DPN-850RX from Toda Kogyo Corp.; titanium oxide TTO-51B, TTO-55A, TTO-55B, TTO-55C, TTO-55S, TTO-55D, and SN-100 from Ishihara Sangyo Co., Ltd.; titanium oxide STT-4D, STT-30D, STT-30, STT-65C, and α-iron oxide α-40 from Titan Kogyo K. K.; titanium oxide MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and $TiO_2$ P25 from Nippon Aerogil; 100 A and 500 A from Ube Industries, Ltd.; and sintered products of the same.

Carbon black can be added to the nonmagnetic layer. Mixing carbon black achieves the known effects of lowering surface electrical resistivity Rs and reducing light transmittance, as well as yielding the desired micro Vickers hardness. Further, the incorporation of carbon black into the nonmagnetic layer can also serve to store lubricants. Examples of types of carbon black that are suitable for use are furnace black for rubber, thermal for rubber, black for coloring, conductive carbon black and acetylene black. Based on the effect desired, the following characteristics should be optimized in the carbon black employed in the nonmagnetic layer, and effects may be achieved by using different carbon blacks in combination. As mentioned above, in order to achieve the desired surface electrical resistivity of the magnetic layer, the quantity of carbon black comprised in the nonmagnetic layer preferably ranges from 5 to 40 weight parts, more preferably 10 to 20 weight parts with respect to 100 weight parts of nonmagnetic powder.

The specific surface area of carbon black employed in the nonmagnetic layer preferably ranges from 50 to 500 $m^2/g$, more preferably from 70 to 400 $m^2/g$ and the DBP oil absorption capacity preferably ranges from 20 to 400 ml/100 g, more preferably from 30 to 400 ml/100 g. The mean particle diameter of carbon black preferably ranges from 5 to 80 nm, more preferably from 10 to 50 nm, further preferably from 10 to 40 nm. It is preferable for carbon black that the pH ranges from 2 to 10, the moisture content ranges from 0.1 to 10 weight % and the tap density ranges from 0.1 to 1 g/ml.

Specific examples of types of carbon black suitable for use in the nonmagnetic layer are: BLACK PEARLS 2000, 1300, 1000, 900, 800, 880, 700 and VULCAN XC-72 from Cabot Corporation; #3050B, #3150B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the nonmagnetic coating liquid. These types of carbon black may be employed singly or in combination. *Carbon Black Handbook* compiled by the Carbon Black Association may be consulted for types of carbon black suitable for use in the present invention.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

As regards types and amounts of binder resins, lubricants, dispersants and additives; solvents; dispersion methods and the like of the nonmagnetic layer, known techniques regarding magnetic layers can be applied.

Conventionally known thermoplastic resins, thermosetting resins, reactive resins and mixtures thereof may be employed as binders used in the magnetic layer and nonmagnetic layer. The thermoplastic resins suitable for use have a glass transition temperature of −100 to 150° C., a number average molecular weight of 1,000 to 200,000, preferably from 10,000 to 100,000, and have a degree of polymerization of about 50 to 1,000. Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten. It is also possible to employ known electron beam-cured resins in individual layers. Examples and details of such resins are described in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —$SO_3M$, —$OSO_3M$, —$P=O(OM)_2$, —O—$P=O(OM)_2$ (where M denotes a hydrogen atom or an alkali metal base), —OH, —$NR_2$, —$N^+R_3$ (where R denotes a hydrocarbon group), epoxy groups, —SH, and —CN. The quantity of the polar group is preferably from $10^{-1}$ to $10^{-8}$ mol/g, more preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder employed in the nonmagnetic layer and magnetic layer in the present invention is suitably employed in a range of 5 to 50 weight percent, preferably from 10 to 30 weight percent with respect to the nonmagnetic powder or the magnetic powder. Vinyl chloride resin, polyurethane resin, and polyisocyanate are preferably combined within the ranges of: 5 to 30 weight percent for vinyl chloride resin, when employed; 2 to 20 weight percent for polyurethane resin, when employed; and 2 to 20 weight percent for polyisocyanate. However, when a small amount of dechlorination causes head corrosion, it is also possible to employ polyurethane alone, or employ polyurethane and isocyanate alone. In the present invention, when polyurethane is employed, a glass transition temperature of −50 to 150° C., preferably 0 to 100° C., an elongation at break of 100 to 2,000 percent, a stress at break of 0.05 to 10 kg/mm$^2$, approximately 0.49 to 98 MPa, and a yield point of 0.05 to 10 kg/mm$^2$, approximately 0.49 to 98 MPa, are desirable.

The magnetic recording medium according to the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the above-described physical characteristics or the like of the resins can naturally be different in each layer as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

Substances having lubricating effects, antistatic effects, dispersive effects, plasticizing effects, or the like may be employed as additives in the magnetic layer and nonmagnetic layer in the present invention. Examples of additives are: molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K, and Cu) thereof, monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms. The quantities of fatty acids comprised in the magnetic layer and the nonmagnetic layer are, respectively, preferably from 1 to 10 weight parts with respect to 100 weight parts of the ferromagnetic powder or the nonmagnetic powder.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.). These lubricants, antistatic agents and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

The lubricants and surfactants suitable for use in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 weight percent, preferably from 2 to 25 weight percent with respect to the ferromagnetic powder in the magnetic layer or the nonmagnetic powder in the nonmagnetic layer is preferred.

All or some of the additives used in the present invention may be added at any stage in the process of manufacturing the magnetic and nonmagnetic coating liquids. For example, they may be mixed with the magnetic material before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits. Known organic solvents may be employed in the present invention. For example, the solvents described in Japanese Unexamined Patent Publication (KOKAI) Showa No. 6-68453 may be employed.

[Backcoat Layer]

In the magnetic recording medium of the present invention, a backcoat layer can be provided on the surface of the nonmagnetic support, opposite to the surface having the magnetic layer. In the backcoat layer, the principal filler employed can be microparticulate carbon black having excellent electrical conductivity. Two types of carbon black having different mean particle sizes can be incorporated, and, as needed, inorganic powder can be incorporated. For example, it is possible to incorporate an inorganic powder with a Mohs' hardness of 5 to 9. The inorganic powder is normally incorporated into the backcoat layer in a proportion of 0.5 to 150 weight parts, preferably 0.5 to 100 weight parts, per 100 weight parts of carbon black.

As mentioned above, the backcoat layer can comprise two types of carbon black having different mean particle sizes. For example, microparticulate carbon black having a mean particle size ranging from 10 to 30 nm and coarse-granular carbon black having a mean particle size ranging from 50 to 500 nm, preferably 60 to 400 nm, can be employed. Generally, the addition of microparticulate carbon black as above achieves lowering the surface electrical resistivity and reducing the light transmittance of the backcoat layer. Since many magnetic recording devices use the light transmittance of the tape for the operating signal, in such cases, it is particularly effective to add microparticulate carbon black. Microparticulate carbon black generally has good liquid lubricant retentivity, and when employed in combination with a lubricant, contributes to reducing the coefficient of friction.

Coarse-granular carbon black with a particle size of 50 to 500 nm, preferably 60 to 400 nm, functions as a solid lubricant, forming minute protrusions on the surface of the backcoat layer, reducing the contact surface area, and contributing to reducing the coefficient of friction.

Specific examples of microparticulate carbon black products are given below. The particle size of each type of carbon black is also given:

Raven 2000B (18 nm), Raven 1500B (17 nm) (both of which are manufactured by Columbia Carbon Co., Ltd.), BP800 (17 nm) (Cabot Corporation), PRINTEX 90 (14 nm), PRINTEX 95 (15 nm), PRINTEX 85 (16 nm), and Printex 75 (17 nm) (manufactured by Degusa Co.), and #3950 (16 nm) (manufactured by Mitsubishi Chemical Corp.).

Specific examples of coarse-granular carbon black products are: Thermal Black (270 nm) (manufactured by Cancarb limited.) and Raven MTP (275 nm) (manufactured by Columbia Carbon Co., Ltd.). Carbon black having a mean particle size of 50 to 500 nm can be selected from black for rubber and carbon black for coloring.

In the present invention, the ratio of microparticulate carbon black to coarse-granular carbon black incorporated is preferably (by weight), former:latter, from 98:2 to 75:25, more preferably from 95:5 to 85:15.

Examples of inorganic powders that can be added to the backcoat layer are those having a mean particle size of 80 to 250 nm and a Mohs' hardness of 5 to 9. The nonmagnetic powders and abrasives employed in the nonmagnetic layer may be employed as inorganic powders. Of these, the use of α-iron oxide and α-alumina is preferred. The inorganic powders are desirably added to the backcoat layer in a proportion of 0.5 to 40 weight parts, preferably 1 to 30 weight parts, per 100 weight parts of binder.

In addition to the above-stated components, optional components in the form of dispersants and lubricants can be added to the backcoat layer. Examples of dispersants are caprylic acid, capric acid, lauric acid, myristic acid, palmitic acid, stearic acid, behenic acid, oleic acid, elaidic acid, linolic acid, linolenic acid, stearolic acid and other fatty acids (RCOOH, where R denotes an alkenyl group or an alkyl group having from 11 to 17 carbon atoms) having from 12 to 18 carbon atoms; metal soaps comprised of one of the above fatty acids and an alkali metal or alkaline earth metal; fluorine-containing compounds in the form of esters of one of the above-described fatty acids; amides of the above-described fatty acids; polyalkyleneoxide alkyl phosphoric esters; lecithin; trialkylpolyolefinoxy quaternary ammonium salts (where the alkyl comprises from 1 to 5 carbon atoms and the olefin is ethylene, propylene, or the like); sulfuric esters; copper phthalocyanine; and precipitated barium sulfate. The dispersant can be added in a range of 0.5 to 20 weight parts per 100 weight parts of binder resin.

Examples of the binder incorporated into the backcoat layer are nitrocellulose resin, polyurethane resin, polyester resin, vinyl chloride resin, and phenoxy resin. The total quantity of the binder in the backcoat layer may be 0.3 to 0.7 of the total weight of the backcoat layer.

The backcoat layer may be provided by the usual methods on the opposite side of the nonmagnetic support from the side on which the magnetic layer is provided. That is, the individual components set forth above are dissolved in a suitable organic solvent, a dispersed coating liquid is prepared, and this coating liquid is applied and dried by the usual methods to form a backcoat layer on the nonmagnetic support. In the present invention, the surface roughness Ra of the backcoat layer, measured by the 3D-MIRAU method as the center-surface average roughness, is preferably from 2.0 to 15 nm, more preferably from 2.0 to 10 nm. Since the surface of the backcoat layer is transferred to the surface of the magnetic layer when the tape is wound, affecting reproduction output and affecting the coefficient of friction with the guide poles, the surface roughness of the backcoat layer is desirably adjusted to fall within the above-stated range. The surface roughness Ra can be adjusted by applying the backcoat layer and then, in the calendering surface processing step, adjusting the material, surface properties, pressure, and the like of the calender rolls. In the present invention, the thickness of the backcoat layer is preferably from 0.2 to 0.8 µm, more preferably from 0.2 to 0.7 µm.

The backcoat layer preferably has an indentation hardness (DH) ranging from 25 to 95 kg/mm$^2$, approximately 245 to 931 MPa, as defined by Equation (1) below for a load/unload curve when a load of 6 mgf, approximately 58.8 µN, is applied to the backcoat layer by a diamond penetrator in the form of a triangular cone with a front tip with a radius of curvature of 100 nm, a blade angle of 65°, and an angle between edges of 115°.

$$DH = 3.7926 \times 10^{-2} \{P\max/(H\max)^2\}(kg/mm^2) = 0.37\{P\max/(H\max)^2\}(MPa) \quad \text{(Equation 1)}$$

Figure 3:
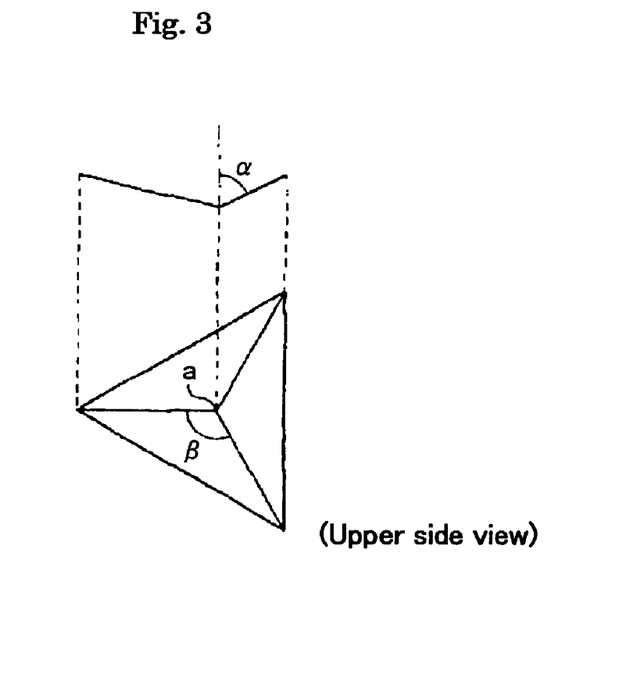
FIG. 3 is a drawing for the explanation of the shape of a penetrator employed for the measurement of indentation hardness (DH) of the backcoat layer.

In the present invention, as shown in FIG. 3, the indentation hardness (DH) is obtained based on a load/unload curve when a diamond penetrator in the form of a triangular cone with a front tip a with a radius of curvature of 100 nm, a blade angle (α) of 65°, and an angle (β) between edges of 115° is pressed onto the backcoat layer at a load of 6 mgf.

When a penetrator of the above-described specific shape is pressed onto the backcoat layer at a load of 6 mgf, the front tip portion a of the penetrator can measure the characteristics at the extreme edge of the surface of the backcoat layer without penetrating to a depth of 0.1 µm into the surface of the backcoat layer, which was previously impossible.

The penetrator of the above shape is known as a Verkovich penetrator. A microindentation measuring device (model: ENT-1100a) made by Areonics, or the like, can be equipped with a Verkovich penetrator and employed as measuring device for measurement at 6 mgf.

Figure 4:
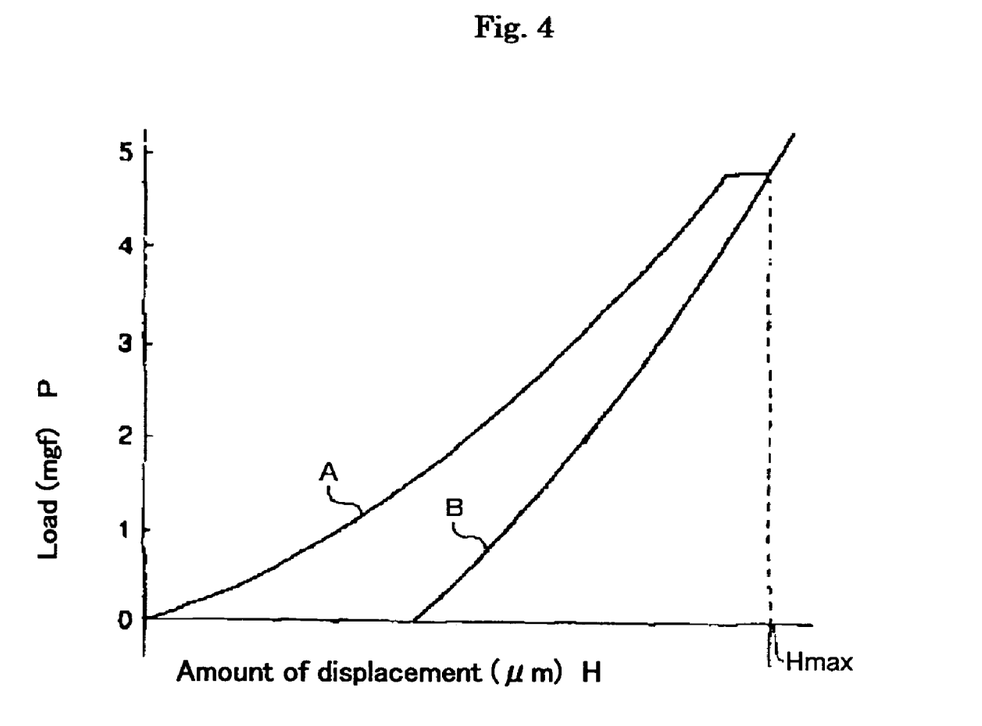
FIG. 4 is a drawing for the explanation of definition of the indentation hardness (DH).

FIG. 4 shows a load/unload curve indicating change in the amount of displacement of a Verkovich penetrator when pressed onto a sample and loaded with a load that has reached 6 mgf after progressively increasing the load. In FIG. 4, as indicated by curve A, the amount of displacement increases as the load is increased, with the maximum amount of displacement (Hmax) being reached at 6 mgf. When the load is removed, the amount of displacement gradually decreases to the curve denoted by B. The indentation hardness (DH) is a value that is calculated from Equation (1) above from the maximum amount of displacement (Hmax) and the maximum load (Pmax=6 mgf). When the indentation hardness (DH) of the backcoat layer falls within a range of 25 to 95 kg/mm$^2$, approximately 245 to 931 MPa, the reduction in rigidity accompanying the reduction in thickness of the tape is eliminated, yielding good recording, reproduction, and running properties.

[Layer Structure]

In the magnetic recording medium of the present invention, the thickness of the nonmagnetic support preferably ranges from 2.5 to 8 µm, and to increase the volume density, more preferably from 2.5 to 7.5 µm, further preferably from 3.0 to 7 µm. An undercoating layer may be provided to improve adhesion between the nonmagnetic support and the nonmagnetic layer or magnetic layer. The thickness of the undercoating layer can be made from 0.01 to 0.5 µm, preferably from 0.02 to 0.5 µm. Known undercoating layers may be employed. In the magnetic recording medium of the present invention, the thickness of the magnetic layer should be optimized for the level of saturation magnetization of the head, the head gap length, and the recording signal band. Generally, a thickness of 0.02 to 0.2 µm is desirable, with 0.05 to 0.2 µm being preferred and 0.08 to 0.2 µm being of even greater preference. The magnetic layer may be separated into two or more layers of different magnetic characteristics, and known multilayered magnetic layer configurations may be adopted.

In the magnetic recording medium of the present invention, a nonmagnetic layer thickness of 0.2 to 3.0 µm is desirable, 0.3 to 2.5 µm is preferred, and 0.5 to 2.0 µm is of even greater preference.

[Nonmagnetic Support]

Known films of the following may be employed as the nonmagnetic support in the present invention: polyethylene terephthalate, polyethylene naphthalate, other polyesters, polyolefins, cellulose triacetate, polycarbonate, polyamides, polyimides, polyamidoimides, polysulfones, aromatic polyamides, polybenzooxazoles, and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127 may be employed to vary the surface roughness of the magnetic surface and support surface. These supports may be subjected beforehand to corona discharge treatment, plasma treatment, adhesion enhancing treatment, heat treatment, dust removal, and the like.

In the present invention, the center surface average surface roughness (SRa) of the support as measured by the MIRAU method with a TOPO-3D made by WYKO is preferably equal to or less than 5.0 nm, more preferably equal to or less than 3.0 nm, further preferably equal to or less than 2.0 nm. Not only does such a support desirably have a low center surface average surface roughness, but there are also desirably no large protrusions equal to or higher than 0.5 µm. The surface roughness shape may be freely controlled through the size and quantity of filler added to the support as needed. Examples of such fillers are oxides and carbonates of elements such as Ca, Si, and Ti, and organic powders such as acrylic-based one. The support desirably has a maximum height $SR_{max}$ equal to or less than 1 µm, a ten-point average roughness $SR_Z$ equal to or less than 0.5 µm, a center surface peak height $SR_P$ equal to or less than 0.5 µm, a center surface valley depth $SR_V$ equal to or less than 0.5 µm, a center-surface surface area percentage SSr of 10 percent to 90 percent, and an average wavelength S $\lambda_a$ of 5 to 300 µm. To achieve desired electromagnetic characteristics and durability, the surface protrusion distribution of the support can be freely controlled with fillers. It is possible to control within a range from 0 to 2,000 protrusions of 0.01 to 1 µm in size per 0.1 mm$^2$.

The F-5 value of the nonmagnetic support in the present invention desirably ranges from 5 to 50 kg/mm$^2$, approximately 49 to 490 MPa. The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm$^2$, approximately 49 to 980 MPa. The modulus of elasticity preferably ranges from 100 to 2,000 kg/mm$^2$, approximately 980 to 19600 MPa. The thermal expansion coefficient preferably ranges from $10^{-4}$ to $10^{-8}$/° C., more preferably from $10^{-5}$ to $10^{-6}/°$ C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

[Manufacturing Method]

The process for manufacturing coating liquids for each layer comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) are kneaded in a range of 15 to 500 parts per 100 parts of the ferromagnetic powder. Details of the kneading process are described in Japanese Unexamined Patent Publication (KOKAI) Heisei Nos. 1-106338 and 1-79274. Further, glass beads may be employed to disperse the coating liquids, with a dispersing medium with a high specific gravity such as zirconia beads, titania beads, and steel beads being suitable for use. The particle diameter and fill ratio of these dispersing media are optimized for use. A known dispersing device may be employed. The ferromagnetic powder, abrasives and carbon black, that have different dispersion speeds, can be pre-dispersed separately and mixed, and if necessary, further dispersed finely to prepare a coating liquid.

Methods such as the following are desirably employed when coating a multilayer-structured magnetic recording medium in the present invention;

(1) A method in which the nonmagnetic layer is first applied with a coating device commonly employed to apply magnetic coating materials such as a gravure coating, roll coating, blade coating, or extrusion coating device, and the magnetic layer is applied while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the upper and lower layers are applied nearly simultaneously using an extrusion coating apparatus with a backup roller as disclosed in Japanese Unexamined Patent Publication (KOKAI) Heisei No. 2-174965. To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid can satisfy the numerical range specified in Japanese Unexamined Patent Publication (KOKAI) Heisei No. 3-8471. Applying the nonmagnetic layer, drying it, and then applying the magnetic layer thereover in a sequential multilayer coating to achieve the structure of the present invention is also possible, and does not compromise the effect of the present invention. However, to reduce the number of voids in the coating and improve the quality as regards dropout and the like, the above-describe simultaneous multilayer coating is preferred.

Processing may be conducted with calender rolls in the form of heat-resistant plastic rolls such as epoxy, polyimide, polyamide, and polyimidoamide, or metal rolls. The processing temperature is preferably equal to or higher than 50° C., more preferably equal to or higher than 100° C. The linear pressure is preferably equal to or higher than 200 kg/cm, approximately 1960 N/cm, more preferably equal to or: higher than 300 kg/cm, approximately 2940 N/cm.

The coefficient of friction of the magnetic recording medium of the present invention relative to the head is preferably equal to or less than 0.5 and more preferably equal to or less than 0.3 at temperatures ranging from −10° C. to 40° C. and humidity ranging from 0 percent to 95 percent, and the charge potential preferably ranges from −500 V to +500 V. The modulus of elasticity at 0.5 percent extension of the magnetic layer preferably ranges from 100 to 2,000 kg/mm$^2$, approximately 980 to 19600 MPa, in each in-plane direction. The breaking strength preferably ranges from 10 to 70 kg/mm$^2$, approximately 98 to 686 MPa. The modulus of elasticity of the magnetic recording medium preferably ranges from 100 to 1,500 kg/mm$^2$, approximately 980 to 14700 MPa, in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent. The glass transition temperature (i.e., the temperature at which the loss elastic modulus of dynamic viscoelasticity peaks as measured at 110 Hz) of the magnetic layer is preferably 50 to 120° C., and that of the nonmagnetic layer preferably ranges from 0 to 100° C. The loss elastic modulus preferably falls within a range of $1 \times 10^3$ to $8 \times 10^4$ N/cm$^2$ and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object.

The center surface average surface roughness Ra of the magnetic layer, measured by the MIRAU method, is preferably from 1.0 to 6.0 nm, more preferably equal to or less than 5.5 nm. The maximum height $R_{max}$ of the magnetic layer is preferably equal to or less than 0.5 μm, the ten-point average surface roughness Rz is preferably equal to or less than 0.3 μm, the center surface peak height Rp is preferably equal to or less than 0.3 μm, the center surface valley depth Rv is preferably equal to or less than 0.3 μm, the center-surface surface area percentage Sr is preferably from 20 to 80 percent, and the average wavelength λ a is preferably from 5 to 300 μm. On the surface of the magnetic layer, it is possible to freely control the number of surface protrusions of 0.01 to 1 μm in size within a range from 0 to 2,000 per 0.1 mm$^2$ to optimize electromagnetic characteristics and the coefficient of friction. These can be readily achieved by controlling surface properties through the filler used in the support, by controlling the particle diameter and quantity of the powder added to the magnetic layer, and by controlling the roll surface configuration in calendar processing. Curling is preferably controlled to within ±3 mm.

In the magnetic recording medium of the present invention, it will be readily deduced that the physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Embodiments

The specific examples of the present invention and comparative examples will be described below. However, the present invention is not limited to the examples. Further, the "parts" given in the embodiments are weight parts unless specifically stated otherwise.

[Embodiment 1]

| Magnetic layer coating liquid | |
|---|---|
| Ferromagnetic metal powder | 100 parts |
| Composition: Fe/Co = 100/30 | |
| Hc: 187 kA/m (2350 Oe) | |
| Specific surface area by BET method: 69 m$^2$/g | |
| Surface treatment agents: Al$_2$O$_3$, SiO$_2$, Y$_2$O$_3$ | |
| Particle size (major axis diameter): 50 nm | |
| Acicular ratio: 7 | |
| σ s: 120 A · m$^2$/kg (120 emu/g) | |
| Content of water-soluble Na: 20 ppm | |
| Content of water-soluble Ca: 10 ppm | |
| Content of water-soluble Fe: 1 ppm | |
| Vinyl chloride copolymer | 12 parts |
| MR 110 manufactured by Nippon Zeon Co., Ltd. | |
| Polyurethane resin | 5 parts |
| Tg = 80° C. | |
| α-Al$_2$O$_3$ | 5 parts |
| Mohs' hardness: 9 | |
| Mean particle diameter: 0.1 μm | |
| Carbon black | 0.5 parts |
| Mean particle diameter: 0.8 μm | |
| Butyl stearate | 1 part |
| Stearic acid | 5 parts |
| Methyl ethyl ketone | 90 parts |
| Cyclohexanone | 30 parts |
| Toluene | 60 parts |

The various components of the above coating liquid were kneaded in an open kneader and dispersed in a sandmill. Forty parts of a mixed solvent of methyl ethyl ketone and cyclohexanone were added to the dispersion and the mixture was passed through a filter having a mean pore size of 1 μm to prepare a magnetic layer coating liquid.

| Nonmagnetic layer coating liquid | |
|---|---|
| Nonmagnetic powder α-Fe$_2$O$_3$ hematite | 80 parts |
| Mean major axis length: 0.10 μm | |
| Specific surface area by BET method: 52 m$^2$/g | |
| pH: 6 | |
| Tap density: 0.8 | |
| DBP oil absorption capacity: 27–38 g/100 g | |
| Surface treatment agent: Al$_2$O$_3$, SiO$_2$ | |
| Content of water-soluble Na: 30 ppm | |
| Content of water-soluble Ca: 5 ppm | |
| Content of water-soluble Fe: 1 ppm | |
| Carbon black | 20 parts |
| Mean primary particle diameter: 16 nm | |
| DBP oil absorption capacity: 80 ml/100 g | |
| pH: 8.0 | |
| Specific surface area by BET method: 250 m$^2$/g | |
| Vinyl chloride copolymer | 17 parts |
| MR110 manufactured by Nippon Zeon Co., Ltd. | |
| Polyurethane resin | 5 parts |
| UR 8200 manufactured by Toyobo Co., Ltd. | |
| α-Al$_2$O$_3$ | 5 parts |
| Mean particle diameter: 0.2 μm | |
| Butyl stearate | 1 part |
| Stearic acid | 1 part |
| Methyl ethyl ketone | 100 parts |
| Cyclohexanone | 50 parts |
| Toluene | 50 parts |

The various components of the above coating liquid were kneaded in an open kneader and dispersed in a sandmill. Forty parts of a mixed solvent of methyl ethyl ketone and cyclohexanone were added to the nonmagnetic layer dispersion and the mixture was passed through a filter having a mean pore size of 1 μm to prepare a nonmagnetic layer coating liquid.

| Backcoat layer coating liquid | |
|---|---|
| Carbon black (A) | 100 parts |
| Particle size: 40 nm | |
| Carbon black (B) | 100 parts |
| SSA (Specific surface area): 115 m$^2$/g | |
| Mean particle diameter: 90 nm | |
| DBP oil absorption capacity: 70 ml/100 g | |
| Nitrocellulose | 90 parts |
| Cellunova BTH 1/2 manufactured by | |
| Asahi Kasei Corporation | |
| Polyurethane resin | 50 parts |
| UR 8200 manufactured by Toyobo Co.,Ltd. | |
| Dispersant | |
| Phthalocyanine-based dispersant (A) | 5 parts |
| Copper oleate | 5 parts |
| Precipitated barium sulfate | 5 parts |
| Methyl ethyl ketone | 800 parts |
| Toluene | 800 parts |

The above components were pre-kneaded in a roll mill and dispersed in a sand grinder. To the dispersant obtained, the following components were added to prepare a backcoat layer coating liquid.

| | |
|---|---|
| Polyester resin | 5 parts |
| Vylon 300 manufactured by Toyobo Co., Ltd. | |
| Polyisocyanate | 5 parts |
| Coronate L manufactured by Nippon Polyurethane Co., Ltd | |

Simultaneous multilayer coating was conducted, with the nonmagnetic layer coating liquid being applied in a quantity calculated to yield a dry thickness of 1 μm to a polyethylene terephthalate resin support 6 μm in thickness and having a magnetic layer coating surface centerline surface roughness of 0.001 μm, and the magnetic layer coating liquid being immediately applied thereover to a thickness of 0.11 μm. While both two layers were still wet, they were oriented by subjecting them to a cobalt magnet with a magnetic force of 0.5 T (5,000 G) and a solenoid with a magnetic force of 0.4 T (4,000 G). They were then dried, after which a backcoat layer was applied to 0.6 μm on the opposite surface from the magnetic layer. Treatment was then conducted with a seven-stage calender comprised of metal rolls at a temperature of 100° C. at a rate of 200 m/min. The product was then slit to a width of ½ mm to complete a digital recording tape.

[Embodiment 2]

With the exceptions that the number of water washings was increased and that ferromagnetic powder and hematite with reduced levels of metal ions were employed, magnetic tape was prepared in the same manner as in Embodiment 1.

[Embodiment 3]

With the exception that the quantity of carbon black incorporated into the nonmagnetic layer was decreased, magnetic tape was prepared in the same manner as in Embodiment 1.

[Embodiment 4]

With the exception that the quantity of carbon black incorporated into the nonmagnetic layer was increased, magnetic tape was prepared in the same manner as in Embodiment 1.

[Embodiment 5]

With the exception that the quantity of abrasive (α-$Al_2O_3$) incorporated into the magnetic layer was reduced, magnetic tape was prepared in the same manner as in Embodiment 1.

Comparative Example 1

With the exception that hematite comprising metal ions in a quantity shown in Table 2 was employed, magnetic tape was prepared in the same manner as in Embodiment 1.

Comparative Example 2

With the exception that hematite and ferromagnetic powder containing metal ions in a quantity shown in Table 2 were employed, magnetic tape was prepared in the same manner as in Embodiment 1.

Comparative Example 3

With the exception that the quantity of carbon black incorporated into the nonmagnetic layer was decreased, magnetic tape was prepared in the same manner as in Comparative Example 2.

Comparative Example 4

With the exception that the quantity of carbon black incorporated into the nonmagnetic layer was increased, magnetic tape was prepared in the same manner as in Comparative Example 2.

Measurement Methods (1) Amount of deposits on the head

The ratio of the area of deposits was visually observed and evaluated on a scale of 0 to 5 points, with 5 points indicating no deposits and 0 points indicating deposits over the entire surface of the head.

(2) Output decrease and noise

A single signal of minimum recording signal length was recorded on a commercial SDLT drive (SDLT320, made by Quantum Corp.), and the 600 m tape was repeatedly run for 600 hours in an environment of 20 percent humidity and 40° C. The differences in output and noise before and after running were measured.

(3) PTR

The shape of the head before and after the running described in (2) above was observed by atomic force microscope (AFM), and the difference in height between the guard part and MR head part was adopted as the PTR.

(4) Abrasiveness of the magnetic layer against a ferrite bar

As set forth above, the abrasiveness of the magnetic layer against ferrite bar was measured using the square bar shown in FIG. 1.

(5) Surface electrical resistivity

The tape was placed on an electrode (made of 24-carat gold) as shown in FIG. 2 and the surface of the magnetic layer of the tape and the electrode were contacted. A force of 1.62 N was applied to both ends of the tape, a d.c. voltage of 100 V±10 V was applied between the electrodes, the current was measured, and the surface electrical resistivity was obtained.

TABLE 1

| | Embodiment 1 | Embodiment 2 | Embodiment 3 | Embodiment 4 | Embodiment 5 |
|---|---|---|---|---|---|
| Total quantity of metal ions of ferromagnetic powder (ppm/g) | 31 | 23 | 31 | 31 | 31 |
| Total quantity of metal ions of hematite (ppm/g) | 36 | 10 | 36 | 36 | 36 |
| Quantity of carbon black in the magnetic layer (weight parts) | 0.5 | 0.5 | 0.5 | 0.5 | 0.5 |
| Quantity of carbon black in the | 20 | 20 | 15 | 25 | 20 |

TABLE 1-continued

|  | Embodiment 1 | Embodiment 2 | Embodiment 3 | Embodiment 4 | Embodiment 5 |
|---|---|---|---|---|---|
| nonmagnetic layer (weight parts) |  |  |  |  |  |
| α-Al$_2$O$_3$ in the magnetic layer (weight parts) | 5 | 5 | 5 | 5 | 3 |
| Quantity of metal ions extracted (ppm/m$^2$ · 100 ml) | 0.4 | 0.1 | 0.4 | 0.4 | 0.4 |
| Surface electrical resistivity(Ω) | $1 \times 10^7$ | $1 \times 10^7$ | $1 \times 10^8$ | $1 \times 10^6$ | $1 \times 10^7$ |
| Amount of head deposits (point) | 4 | 5 | 4.5 | 3.5 | 3.8 |
| Output decrease/600 h (dB) | −0.5 | −0.3 | −0.3 | −0.4 | +0.2 |
| Noise/600 h (dB) | −0.1 | −0.1 | 0.7 | 0 | 0.3 |
| Abrasiveness (μm/m) | 1.8*10$^{-5}$ | 1.6*10$^{-5}$ | 1.7*10$^{-5}$ | 1.9*10$^{-5}$ | 1.0*10$^{-5}$ |
| PTR ('nm/600 h) | 15 | 18 | 16 | 17 | 8 |

TABLE 2

|  | Comp. Ex. 1 | Comp. Ex. 2 | Comp. Ex. 3 | Comp. Ex. 4 |
|---|---|---|---|---|
| Total quantity of metal ions of ferromagnetic powder (ppm/g) | 31 | 70 | 70 | 70 |
| Total quantity of metal ions of hematite (ppm/g) | 50 | 50 | 50 | 50 |
| Quantity of carbon black in the magnetic layer (weight parts) | 0.5 | 0.5 | 0.5 | 0.5 |
| Quantity of carbon black in the nonmagnetic layer (weight parts) | 20 | 20 | 10 | 30 |
| α-Al$_2$O$_3$ in the magnetic layer (weight parts) | 5 | 5 | 5 | 5 |
| Quantity of metal ions extracted (ppm/m$^2$ · 100 ml) | 2.0 | 2.4 | 2.3 | 2.6 |
| Surface electrical resistivity(Ω) | $2 \times 10^7$ | $1 \times 10^7$ | $5 \times 10^8$ | $5 \times 10^5$ |
| Amount of head deposits (point) | 2.5 | 2 | 2.5 | 1 |
| Output decrease/600 h (dB) | −2.5 | −3.2 | −3 | −6.2 |
| Noise/600 h (dB) | 0.2 | 0.3 | 2 | 0.2 |
| Abrasiveness (μm/m) | 1.7*10$^{-5}$ | 1.8*10$^{-5}$ | 1.6*10$^{-5}$ | 1.7*10$^{-5}$ |
| PTR ('nm/600 h) | 27 | 28 | 25 | 35 |

Evaluation Results

The magnetic tapes of Embodiments 1 to 5 had low levels of head deposit and a low abrasiveness of the magnetic layer against a ferrite bar of equal to or less than 2×10$^{-5}$ μm/m. These tapes exhibited low PTR values and little head wear. They also exhibited little drop in reproduction output and little noise increase following repeated running.

By contrast, the magnetic tapes of Comparative Examples 1 to 4, in which hematite containing 50 ppm/g of metal ions was employed, exhibited a quantity of metal ions extracted from the magnetic layer exceeding 0.5 ppm/m$^2$·100 mL and increased head deposits. The PTR value increased due to the increase in head deposits. These tapes also exhibited a significant decrease in reproduction output and increase in noise following repeated running. In particular, the magnetic tape of Comparative Example 3 exhibited a marked increase in noise. This was attributed to high magnetic layer surface electrical resistivity causing static electricity to build up in the tape and head, discharge during sliding of the tape against the head, and increase noise.

The magnetic recording medium of the present invention can be suitably employed in a magnetic recording and reproduction device in which a shield-type magnetoresistive reproduction head is employed.

What is claimed is:

1. A magnetic recording medium comprising a nonmagnetic layer comprising a nonmagnetic powder and a binder and a magnetic layer comprising a ferromagnetic powder and a binder in this order on a nonmagnetic support, wherein
    the quantity of metal ions extracted from said magnetic layer by washing with water is equal to or less than 0.5 ppm/m$^2$·100 mL, and
    the quantity of metal ions comprised in said nonmagnetic powder is equal to or less than 40 ppm/g, and wherein said magnetic layer has a surface electrical resistivity ranaina from 10$^{+6}$ to 10$^{+8}$ Ω.

2. The magnetic recording medium according to claim 1, wherein the abrasiveness of said magnetic layer against a ferrite bar is equal to or less than 2×10$^{-5}$ μm/m.

3. The magnetic recording medium according to claim 1, which has a backcoat layer on the surface of the nonmagnetic support, opposite to the surface having the magnetic layer.

4. The magnetic recording medium according to claim 1, which is employed in a magnetic recording and reproduction device in which a magnetoresistive reproduction head is employed.

5. The magnetic recording medium according to claim 4, wherein said magnetoresistive reproduction head is a shielded magnetoresistive reproduction head.

6. A method of reproducing a signal magnetically recorded on a magnetic recording medium with a magnetoresistive reproduction head, wherein said magnetic recording medium is the magnetic recording medium according to claim 1.

7. The method according to claim 6, wherein said magnetoresistive reproduction head is a shielded magnetoresistive reproduction head.

* * * * *